(12) United States Patent
Amoroso et al.

(10) Patent No.: US 11,494,539 B2
(45) Date of Patent: Nov. 8, 2022

(54) DYNAMIC RANDOM-ACCESS MEMORY PASS TRANSISTORS WITH STATISTICAL VARIATIONS IN LEAKAGE CURRENTS

(71) Applicant: Synopsys, Inc., Mountain View, CA (US)

(72) Inventors: Salvatore Maria Amoroso, Hamilton (GB); Plamen A. Asenov, Glasgow (GB); Jaehyun Lee, Glasgow (GB); Andrew R. Brown, Glasgow (GB); Manuel Aldegunde Rodriguez, Glasgow (GB); Binjie Cheng, Glasgow (GB); Andrew John Pender, Glasgow (GB); David T. Reid, Glasgow (GB)

(73) Assignee: Synopsys, Inc., Mountain View, CA (US)

(*) Notice: Subject to any disclaimer, the term of this patent is extended or adjusted under 35 U.S.C. 154(b) by 135 days.

(21) Appl. No.: 17/172,520

(22) Filed: Feb. 10, 2021

(65) Prior Publication Data
US 2021/0248296 A1 Aug. 12, 2021

Related U.S. Application Data

(60) Provisional application No. 62/975,714, filed on Feb. 12, 2020.

(51) Int. Cl.
*G06F 30/367* (2020.01)
*G06F 111/10* (2020.01)
*H01L 27/108* (2006.01)

(52) U.S. Cl.
CPC ........ *G06F 30/367* (2020.01); *G06F 2111/10* (2020.01); *H01L 27/10823* (2013.01)

(58) Field of Classification Search
CPC ..................................................... G06F 30/367
See application file for complete search history.

(56) References Cited

PUBLICATIONS

Lema et al. Performance and Variability of Doped Multithreshold FinFETs for 10-nm CMOS IEEE Transactions on Electron Devices, vol. 61, No. 10, Oct. 2014 (Year: 2014).*

(Continued)

*Primary Examiner* — Rehana Perveen
*Assistant Examiner* — Cuong V Luu
(74) *Attorney, Agent, or Firm* — Patterson + Sheridan, LLP

(57) ABSTRACT

The design of Dynamic Random Access Memory (DRAM) pass transistors is provided via generating a first plurality of transistor leakage currents by simulating different dopant configurations in a transistor; generating a second plurality of transistor leakage currents by simulating, for each dopant configuration of the different dopant configurations, a single trap insertion in the transistor; fitting the first and second pluralities of transistor leakage currents with first and second leakage current distributions; combining the first and second leakage current distributions to produce a third leakage current distribution; generating a third plurality of statistically generated leakage currents for a specified trap density for the transistor based on the first leakage current distribution, on the second leakage current distribution and on a specified trap density; and modeling and evaluating a DRAM cell including the transistor based on the third plurality of statistically generated leakage currents.

20 Claims, 11 Drawing Sheets

(56) References Cited

PUBLICATIONS

Jin et al. Prediction of Data Retention Time Distribution of DRAM by Physics-Based Statistical Simulation IEEE Transactions on Electron Devices, vol. 52, No. 11, Nov. 2005 (Year: 2005).*

Cho et al. An Innovative Indicator to Evaluate DRAM Cell Transistor Leakage Current Distribution Journal of the Electron Devices Society, Apr. 26, 2018 (Year: 2018).*

Yuki Mori et al: "New Method for Evaluating Electric Field at Junctions of DRAM Cell Transistors by Measuring Junction Leakage Current",I EEE Transactions On Electron Devices, IEEE Service Center, Piscataway, NJ' us,vol. 56, No. 2,Feb. 1, 2009 (Feb. 1, 2009), pp. 252-259, XP011241420, ISSN: 0018-9383, DOI: 10.1109/TED.2008.2010576, p. 252-p. 255; figures 1-4.

Moriy et al: 11 A new expenmental method for evaluating electric field at the junctions of DRAM cell transistors and the effect of electric field strength on the retention characteristics of DRAM 11 , Reliability Physics Symposium Proceedings, 2004. 42nd Annual. 2004 IEEE International Phoenix, AZ, USA Apr. 25-29, 2004, Piscataway, NJ, USA, I EEE, Apr 25, 2004 (Apr. 25, 2004), pp. 157-164, XP010711039, DOI: 10.1109/RELPHY.2004.1315317 ISBN: 978-0-7803-8315-9 p. 168.

Hurkx G A M et al: 11 Anomalous Behaviour of Surface Leakage Currents in Heavi ly-Doped MOS Structu res 11 , International Electron Devices Meeting 1992. San Francisco, Dec. 13-16, 1992; [Internati onal Electron Devices Meeting (I EDM)], New York, IEEE, US, Dec. 13, 1992 (Dec. 13, 1992) , pp. 919-922, XP000687575, ISBN: 978-0-7803-0818-3 figures 4-5.

Myoung J in Lee et al: 11 A Proposal on an Optimized Device Structure With Experimental Studies on Recent Devices for the DRAM Cel l Transi stor11, IEEE Transacti ons On Electron Devices, IEEE Service Center, Pisacataway, NJ , US, vol. 54, No. 12, Dec. 1, 2007 (Dec. 1, 2007), pp. 3325-3335, XP011197101, ISSN: 0018-9383 figures 3-13.

Rodriguez et al: 11 TCAD simulations of leakage currents induced by SDRAM single-event cell degradation 11 , 2016 16th European Conference on Radiation and Its Effects on Compon ents and Systems (RAD ECS), IEEE, Sep. 19, 2016 (Sep. 19, 2016), pp. 1-5, XP033243500, DOI: 10.1109/RADECS .2016.8093106 [retrieved on Oct. 31, 2017] Section III.

International application No. PCT/US2021/017385, International Search Report and Written Opinion dated Jun. 11, 2021 consists of 14 pages.

International application No. PCT/US2021/017385, International Prelimianry Report on Patentability dated Aug. 25, 2022 consists of 8 pages.

* cited by examiner

DYNAMIC RANDOM-ACCESS MEMORY PASS TRANSISTORS WITH STATISTICAL VARIATIONS IN LEAKAGE CURRENTS

CROSS-REFERENCES TO RELATED APPLICATIONS

The present disclosure claims priority to provisional application 62/975,714 titled "TCAD-to-SPICE Simulation Method to Design Advanced DRAM Pass Transistors with Optimal Margining Against Statistical Variations in Leakage Current," which was filed on 2020-Feb.-12, and is incorporated by reference herein in its entirety.

TECHNICAL FIELD

The present disclosure generally relates to an electronic design automation (EDA) system. In particular, the present disclosure relates to the design of DRAM (Dynamic Random-Access Memory) pass transistors with statistical variations in leakage currents using computer simulations.

BACKGROUND

The one pass transistor/one capacitor storage node (1T1C) DRAM cell design is a design that has evolved from a planar technology towards complex non-planar structures for both the pass transistors and the capacitive storage node included therein. This evolution has enabled a continued reduction in the size of the DRAM cell, increasing the memory density per chip, while maintaining a good scaling efficiency with the area occupied by a single memory cell being close to $6F^2$ per cell, where F is the minimum feature size in the cell (typically the gate pitch). Vertical gate-all-around solutions have been proposed that could enhance the scaling efficiency to $4F^2$. In order to enable these scaling trends, both the storage capacitors and the pass transistors for the DRAM cells are engineered to provide very low leakage current to have a bit retention time longer than the bit refresh time. The higher the refresh frequency, the higher the power consumption will be.

SUMMARY

The present disclosure provides, in one embodiment, a system comprising: a processor; and a memory including instructions that when executed by the processor perform an operation including: generating a first plurality of transistor leakage currents by simulating different dopant configurations in a transistor; generating a second plurality of transistor leakage currents by simulating, for each dopant configuration of the different dopant configurations, a single trap insertion in the transistor; fitting the first plurality of transistor leakage currents to a first leakage current distribution; fitting the second plurality of transistor leakage currents to a second leakage current distribution; generating a third plurality of leakage currents for a specified trap density for the transistor based on the first and second leakage current distributions; transforming the third plurality of leakage currents to a model parameter for a DRAM cell including the transistor; and evaluating the DRAM cell including the transistor based on the model parameter.

The present disclosure provides, in one embodiment, a method comprising: generating a first plurality of transistor leakage currents by simulating different dopant configurations in a transistor; generating a second plurality of transistor leakage currents by simulating, for each dopant configuration of the different dopant configurations, a single trap insertion in the transistor; fitting the first plurality of transistor leakage currents to a first leakage current distribution; fitting the second plurality of transistor leakage currents to a second leakage current distribution; combining the first leakage current distribution and the second leakage current distribution to produce a third leakage current distribution; generating a third plurality of statistically generated leakage currents for a specified trap density for the transistor based on the first and second leakage current distributions and the specified trap density; mapping the third plurality of statistically generated leakage currents to model parameter values for circuit simulation of a DRAM cell including the transistor; and evaluating the DRAM cell including the transistor based on the model parameter.

The present disclosure provides, in one embodiment, a non-transitory computer-readable storage medium including instructions that when executed by a processor perform an operation comprising: evaluating a statistical compact model of a DRAM cell with a first trap density to determine whether a response refresh time emulated for a pass transistor included in the DRAM cell satisfies a threshold; in response to determining that the response refresh time does not satisfy the threshold: selecting a second, different trap density for the DRAM cell; reevaluating the statistical compact model of a DRAM cell with the second trap density to determine whether the response refresh time emulated for the pass transistor included in the DRAM cell satisfies the threshold; in response to the response refresh time satisfying the threshold, indicating the DRAM cell to be acceptable; wherein: the statistical compact model is generated via a first plurality of statistical simulations of the DRAM cell that produces a first leakage current distribution representing a baseline leakage current and a second plurality of statistical simulations of the DRAM cell that produces a second leakage current distribution representing an additional-leakage current distribution, wherein the first and second leakage current distributions are combined to create a third leakage current distribution representing an induced drain leakage in the DRAM cell; and the third leakage current distribution is extrapolated based on a specified trap density to describe a statistical leakage current for the DRAM cell at the specified trap density.

BRIEF DESCRIPTION OF THE DRAWINGS

The disclosure will be understood more fully from the detailed description given below and from the accompanying figures of embodiments of the disclosure. The figures are used to provide knowledge and understanding of embodiments of the disclosure and do not limit the scope of the disclosure to these specific embodiments. Furthermore, the figures are not necessarily drawn to scale.

DETAILED DESCRIPTION

Figure 1:
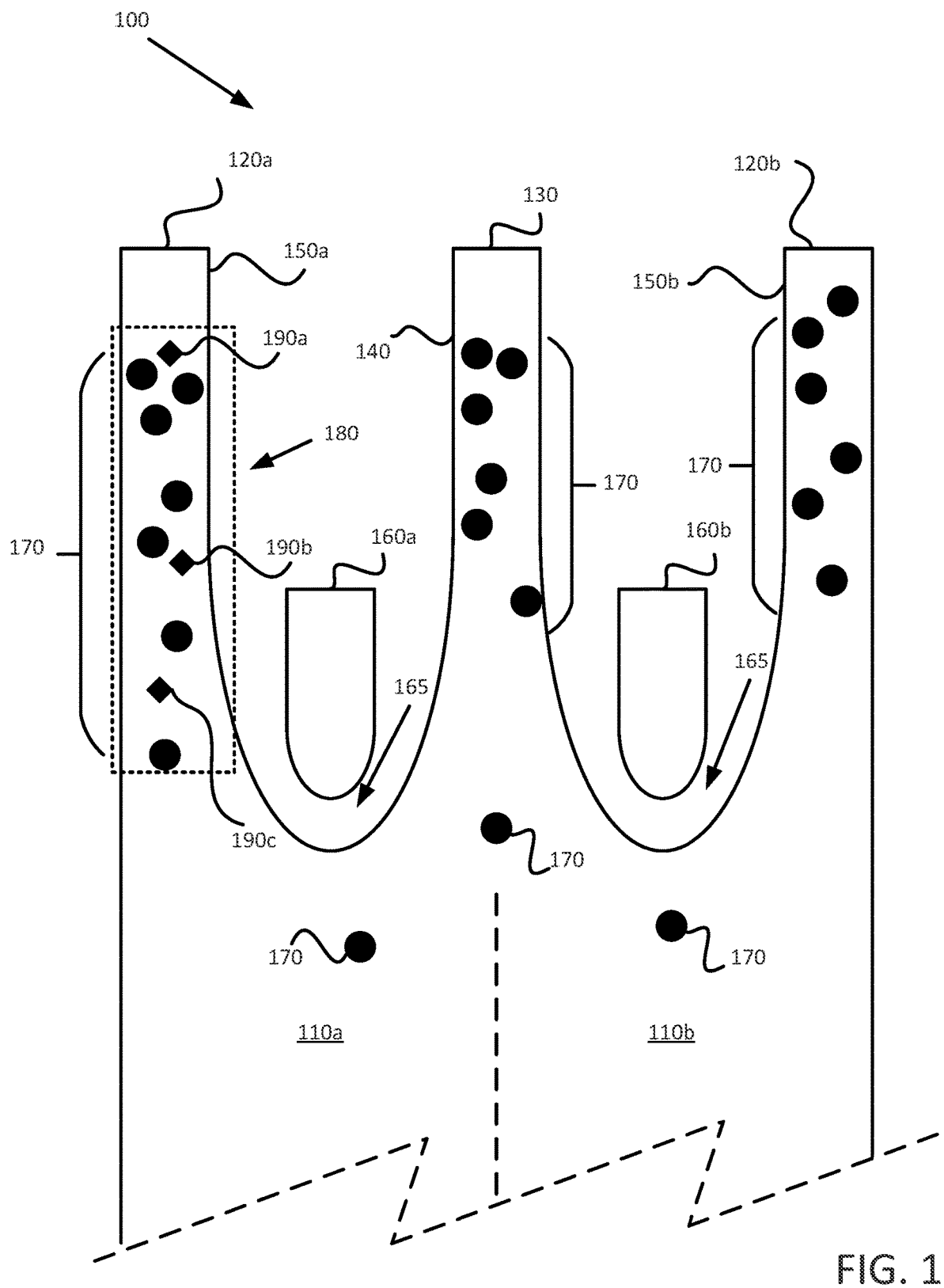
FIG. 1 illustrates a schematic structure of a DRAM cell that, for TCAD simulations, is obtained by process emulation and process simulation, in accordance with various embodiments of the present disclosure.

Embodiments of the present disclosure provide a novel simulation flow, which progresses from Technology Computer-Aided Design (TCAD) data to circuit simulation using a circuit emulator, such as SPICE (Simulation Program with Integrated Circuit Emphasis), to predict the statistical dispersion of pass transistor leakage current limiting the refresh time of DRAMs.

Due to the high aspect ratio and small area per cell, there is a physical limit to increasing the capacitance of the storage capacitor. Thus, it is desirable to focus on the engineering of the pass transistor to increase retention, which usually relies on the application of a non-zero substrate bias, and on the optimization of doping profiles together with the gate-to-drain overlap. Engineering the pass transistor in this manner is a multidimensional and difficult task, which may require several very expensive trials on silicon wafers. Moreover, because these leakage currents are on the order of magnitude of attoamperes, it is physically impossible to experimentally measure the leakage current coming from a single cell. Therefore, leakage measurements can be performed only on large arrays of cells, therefore not allowing a physical understanding of the mechanisms ruling the stochastic retention of the single defective cell.

A simulation of leakage current due to defects in the semiconductor regions of a device may be carried out by means of three-dimensional Technology Computer-Aided Design (TCAD) drift-diffusion simulations that include carrier generation/recombination. The recombination/generation of carriers is usually described by a Shockley-Read-Hall equation per Formula [1], where the lifetimes are modified according to an auxiliary Hurkx equation per Formula [2] and Formula [3] to describe the effect of trap-assisted tunneling.

$$R_{net} = \frac{N_0 v_{th}^n v_{th}^p \sigma_n \sigma_p (np - n_{i,eff}^2)}{v_{th}^n \sigma_n \left(n + \frac{n_1}{g_n}\right) + v_{th}^p \sigma_p \left(p + \frac{p_1}{g_p}\right)} \quad [1]$$

$$\sigma = \sigma_0 (1 + \gamma_{TAT}) \quad [2]$$

$$\gamma_{TAT} = \frac{E_T}{kT} \int_0^1 \exp\left[\frac{E_T}{kT}u - \frac{\sqrt[4]{2m*E_T^3}}{3qh|F|} u^{3/2}\right] du \quad [3]$$

Although such TCAD simulations determine transistor leakage currents, the solution of the additional recombination equations (i.e., Formulas [1-3]) significantly increases TCAD simulation time and decreases the TCAD simulation yield due to non-convergence of the iterative solver schemes.

The technical benefits and improved/expanded functionalities offered by such an approach include: enabling the physical understanding of the leakage mechanisms of the individual defective cells; allowing cell optimization at a negligible fraction of the cost of wafer-based optimization; improving the ease of use of implementation in any pre-existing platform that features a TCAD simulator, a circuit model extractor and a circuit simulator. As the flow is implemented based on physical TCAD simulation tool output, the flow is also extensible to other simulatable variation mechanisms related to refresh time including, but not limited to: write current variation, capacitance variation, capacitor leakage variation, sense-amplifier variations and supply voltage fluctuations.

The analysis system uses a post-processing method on a TCAD simulation to enable fast-yet-accurate simulation of leakage current in DRAM pass transistors in the presence of one single randomly positioned trap. The analysis system fits the single-trap-induced leakage data obtained from TCAD simulation (from post-processing) by means of a multi-function probability density to properly capture the statistical variability related to random discrete dopants and the tails of the statistical distribution related to randomly positioned discrete traps. The analysis system extracts compact model parameters based on target TCAD data and on the fast-yet-accurate generation of statistical compact models for arbitrary trap density values. The analysis system performs statistical circuit simulations (e.g., with a SPICE simulator) using the statistical compact models. The embodiments discussed herein enable the understanding of leakage mechanisms in a single DRAM cell and the prediction of the statistical distribution of leakage current in DRAM cells. When employed in the framework of a Design of Experiments (DOE) or inside a design optimization loop, this disclosure enables the refinement of the pass transistor design to minimize leakage and maximize refresh time at negligible cost and duration when compared to optimization based on silicon wafer production.

In general, the present disclosure includes a method that implements a simulation-based flow to predict the statistical variability of pass transistor leakage current, which limits the refresh time of advanced DRAMs, and to enable the optimization of the pass transistor design in the presence of statistical variability. As used in the art, and as understood by a person having ordinary skill in the art, "optimization", "optimize", "optimizing", and variants thereof, refer to a mathematical formulation of a problem to select some improvement (if an improvement is available) of some identified characteristic or constraint, and does not imply an absolute or global optimal improvement of the characteristic or constraint (as the term may be more colloquially used). Accordingly, in some situations, optimization may determine a minimum, where the minimum may be a local minimum rather than the global minimum. For example, a first design optimized for a reduced footprint may consume more power than a second design optimized for low power consumption. In another example, a first design optimized for reduced wire length may have a lower total wire length over the entirety of the circuit than a second design (e.g., the first design demonstrates a global minimum for wire length), but may also have a longer individual wire length between a first element and a second element than in the second design (e.g., the second design demonstrates a local minimum). Accordingly, an "optimized" design is created or updated to improve the overall metric for one or more actively specified constraints and/or objectives, and may represent several layered design considerations in various priorities of optimization.

FIG. 1 illustrates a schematic structure 100 of a DRAM cell that, for TCAD simulations, is obtained by process emulation and process simulation, in accordance with various embodiments of the present disclosure. FIG. 1 shows a typical $6F^2$ DRAM cell transistor structure 100, representative of nanometer scale generation, which can be obtained by process emulation or process simulation. The TCAD design of FIG. 1 can be used as input for a statistical drift-diffusion simulator, where the continuous doping is stochastically discretized into individual dopant atoms (shown as circular inclusions as the dopants 170), and hundreds of statistical instances of the nominal device are simulated to obtain the statistical dispersion of the transistor performance.

As shown, the TCAD structure 100 is a shared design that connects a shared bit-line contact 130 between two storage node contacts 120a, 120b connected to respective storage capacitors (not illustrated). Two pass-transistors 110a, 110b are connected to a bit-line contact 130 via a shared bit-line pillar 140, where the first pass transistor 110a is connected to the first storage node contact 120a via a first storage pillar 150a, and the second pass transistor 110b is connected to the second storage node contact 120b via a second storage pillar 150b. Additionally, gate contacts 160a, 160b are shown for the gate regions of the respective pass-transistor 110a, 110b with gate oxide 165 between the gate contacts 160a, 160b and the pass-transistors 110a, 110b. Although illustrated as a shared design, the present disclosure may be applied in single capacitor/transistor designs (e.g., with one storage capacitor, storage pillar, and gate contact) with various configurations and geometries of the individual components.

In each of the pillars 140, 150a, 150b, several dopants 170 are illustrated, and a lower concentration of dopants 170 are illustrated in the bodies of the pass-transistors 110a, 110b. When simulating the structure 100, the analysis system generates traps 190a-c (generally or collectively, traps 190) at random positions in a region of interest, such as in the boxed area 180 in the first storage pillar 150a. A trap 190 represents an unwanted defect or imperfection in the associated base material, which allows for current to leak from a storage capacitor. Other regions of interest (e.g., in the second storage pillar 150b, the bit-line pillar 140, or the body of the pass-transistors 110a, 110b) are possible. The definition for the traps 190 specifies a density within a volume of silicon (in the present example traps/cm$^3$ or traps·cm$^{-3}$), and for a given volume, an average trap quantity can be determined based on a known or selected density value therefor. In one embodiment, the distribution of the number of traps 190 conforms to a Poisson distribution, so the average quantity of traps 190 represents the average value of the Poisson distribution.

The number of traps 190 placed in the region of interest affect the refresh time of the pass-transistor 110a (or 110b), and the placement and calculation of the effect of these traps 190 generally requires significant computing resources to calculate or the use of physical experiments on silicon prototypes for the design to determine experimentally. The present disclosure provides improvements to the computational efficiency and speed of this simulation, and the ability to avoid the need to experiment on physical prototypes, thus allowing users to quickly and accurately explore options in the design of the TCAD structure 100 by calculating a leakage current distribution that can be extrapolated from a single trap to various user-definable trap densities in an area of interest.

Figure 2:
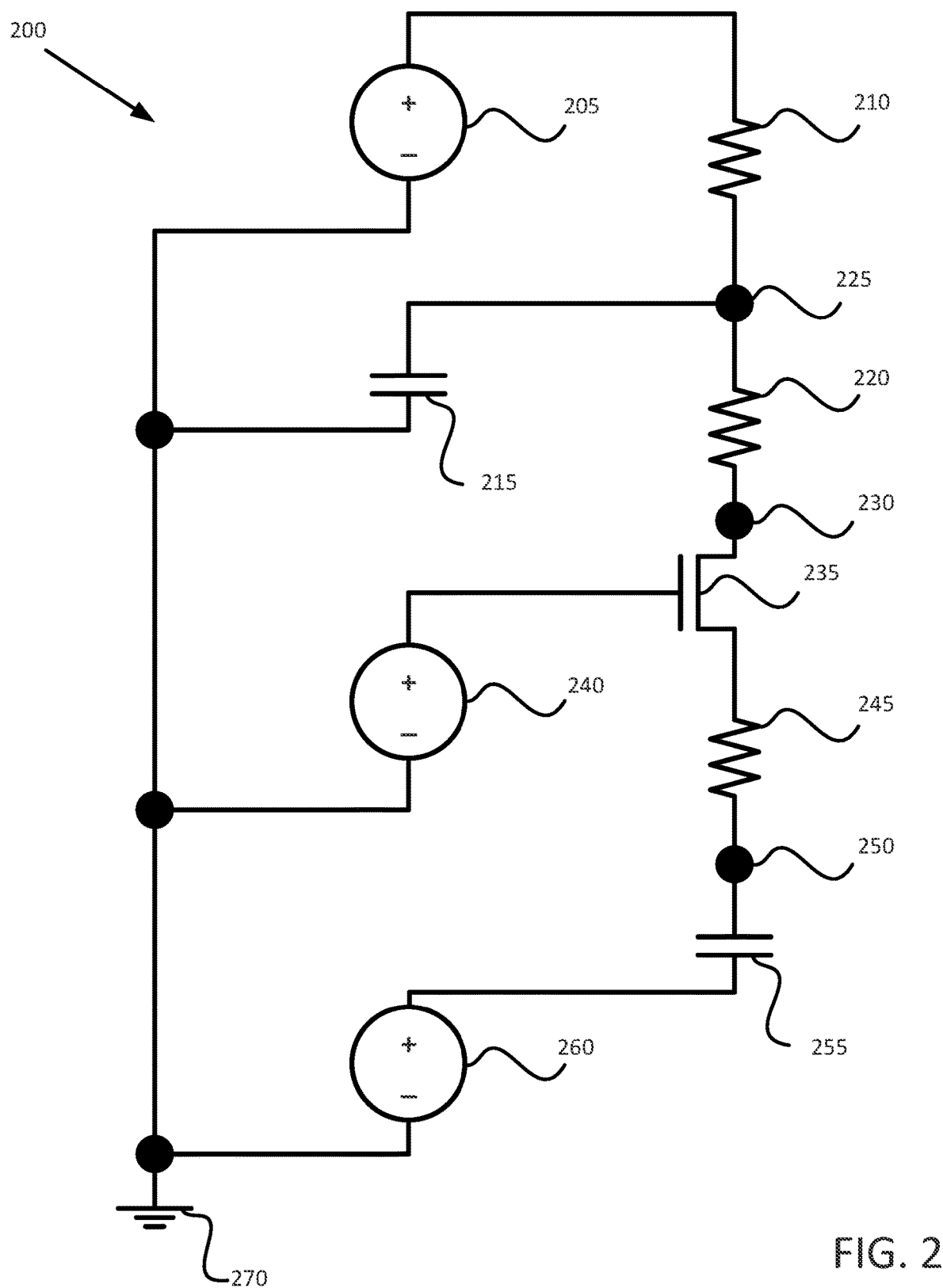
FIG. 2 is a circuit diagram illustrating a circuit model of the DRAM cell in accordance with various embodiments of the present disclosure.

FIG. 2 is a circuit diagram illustrating an integrated circuit model 200 (e.g., a SPICE model) of the DRAM cell in accordance with embodiments of the present disclosure. In the integrated circuit model 200, components and connections between the storage pillar 150a and the bit-line pillar 140 include a bit-line voltage supply 205, representing the applied bit-line voltage ($V_{BL}$), a bit-line resistance 210 representing resistance in the bit-line ($R_{BL}$), a bit-line capacitance 215 representing capacitance between the bit-lines ($C_{BL}$), and a bit-line contact resistance 220 representing resistance in the contact 130 in the bit-line pillar 140 to the contact for the storage capacitor ($R_{BL\_contact}$). The bit-line capacitance 215 is modeled as connected between a mid-node 225 (located between the bit-line resistance 210 and the bit-line contact resistance 220) and ground 270. The bit-line voltage supply 205 is modeled as connected between ground 270 and the bit-line resistance 210.

A first node 230 is represented in the model 200 to measure/simulate an input voltage ($V_{N1}$) to the pass transistor 235 (e.g., one of the pass transistors 110a, 110b in FIG. 1), which is modeled with a controllable gate voltage supply 240 configured to apply a gate voltage ($V_{Gate}$) to the gate of the pass transistor 235. A source/drain contact resistance 245 representing resistance in the source/drain or storage pillar 150a ($R_{sc\_contact}$) is modeled between the source of the pass transistor 235 and a second node 250. The second node 250 is represented in the model 200 to apply a leakage current to the storage capacitor 255 for the DRAM cell via capacitor source 260 ($V_{CAP}$). When using a statistical compact model, the value of the leakage current (as a junction leakage parameter) is selected randomly from any of the set of potential leakage currents that are statistically determined according to method 300 described in relation to FIG. 3. Each model 200 analyzed has unique parameters assigned according to the statistical set, meaning that every transistor is analyzed with different leakage characteristics. As is described in greater detail in regard to FIGS. 7 and 8, the leakage characteristics are associated with a different trap densities so that several values for a leakage current can be analyzed during simulation, and the probability of a given value be selected matches the probability distribution determined according to method 300 described in relation to FIG. 3.

Figure 3:
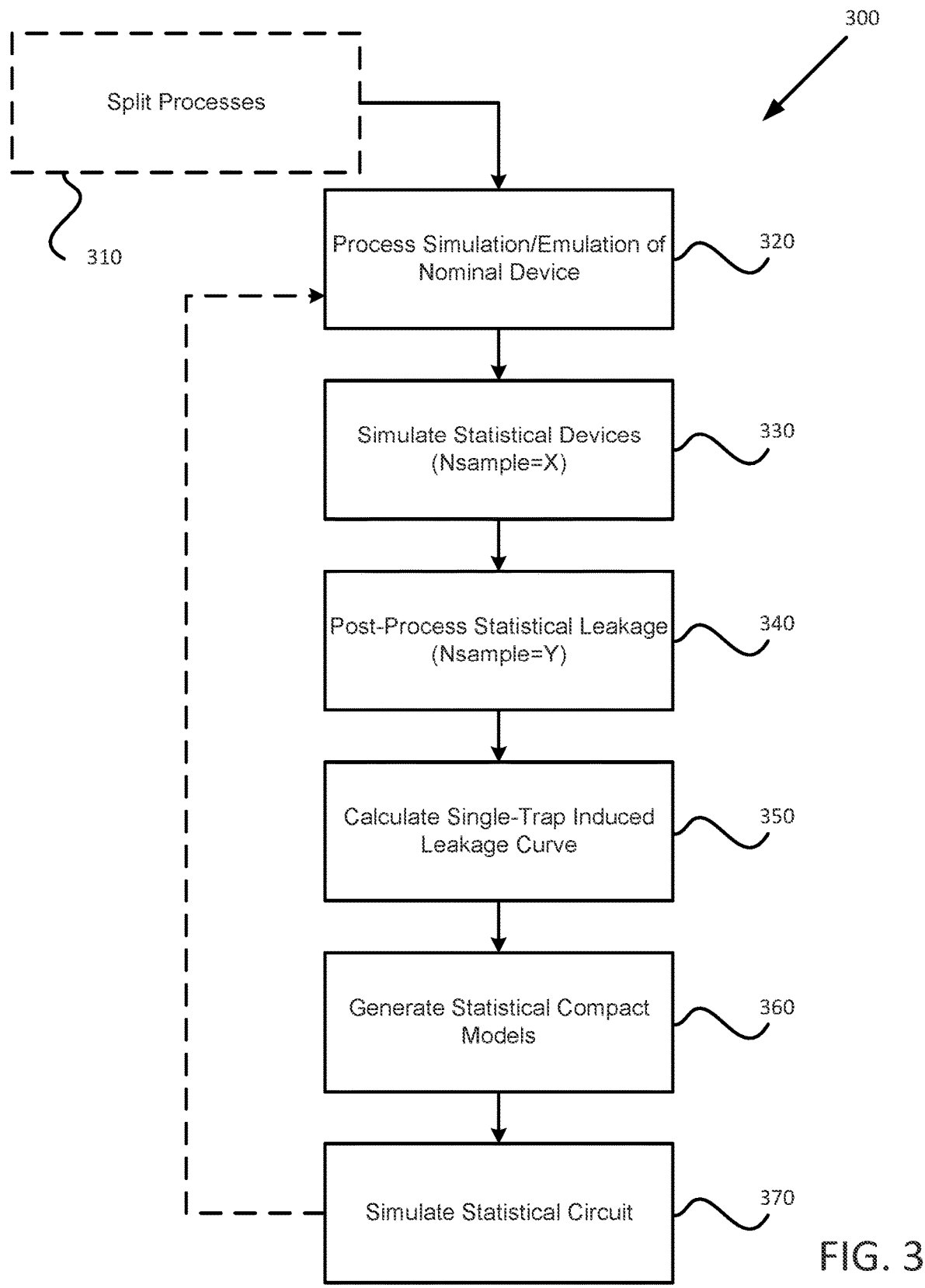
FIG. 3 is a flowchart of a method for optimizing pass transistor design in accordance with various embodiments of the president disclosure.

FIG. 3 is a flowchart of a method 300 for optimizing pass transistor design in accordance with various embodiments of the president disclosure. Method 300 may be performed via a Design of Experiments (DoE) methodology via an iterative loop methodology. When method 300 uses a DoE methodology, method 300 begins at 310, where the analysis system performs a plurality of N process splits before performing N iterations of 320-370 (one iteration per each process split) and selects the result of the best split, either directly or through response-surface based interpolation as the final output of method 300. When method 300 uses an iterative loop methodology, each iteration begins at 320, and the results of a given iteration are used to initiate a new iteration, restarting from 320 until an optimization criterion or runtime threshold is reached to provide a final output of method 300.

At 320, the system performs TCAD-based post-process simulation/emulation of leakage currents in a nominal device. During TCAD-based post-process simulation, the system creates a TCAD design of the DRAM cell (such as that shown in FIG. 1) to be analyzed to determine (in 330 and 340) the leakage current distributions for that design.

At 330, the system simulates X TCAD designs (e.g., such as is shown in FIG. 1) and performs X statistical simulations on these statistical designs, where each of the X simulations features a corresponding set of discrete random dopants in the source/drain regions of the pass transistor. In various embodiments, the value of X is a user-configurable parameter, which may be generally in the order of hundreds of simulation (e.g., X=95, 100, 200, 107, etc.), but various simulations can use various different numbers of simulations. In one embodiment, the analysis system performs these simulations using the principal drift-diffusion equations, but without using recombination Formulas [1-3] described above. Each of these X simulations provides a corresponding pass transistor leakage current. Note that the leakage current in the DRAM pass transistor is small enough that omitting the recombination Formulas [1-3] during the initial X simulations does not significantly perturb the solution of the principal drift-diffusion equations.

At 340, the system simulates the TCAD design to perform Y post-processing simulations on the X initial statistical simulations identified in 330. In various embodiments, the value of Y is a user-configurable parameter, which may be generally in the order of thousands of simulation (e.g., Y=950, 1000, 2000, 1007, etc.), but various simulations can use various different numbers of simulations. For example, when the system performed one hundred simulations (e.g., X=100) in 330, and the user selects to perform one thousand post-processing simulations thereon (e.g., Y=1000), the system performs one hundred thousand post-processing simulations in 340 (e.g., X*Y=100000). Each of these Y post-processing simulations introduces a single discrete trap to a random location near the drain of the pass transistor (wherein the drain of the pass transistor is coupled to the capacitive storage node). The analysis system uses recombination Formulas [1-3] to determine the corresponding pass transistor leakage current for each of these post-processing simulations.

340 uses the output of each statistical simulation in the set of X to calculate Y times (by means of an uncoupled post-processing) the leakage according to Formulas [1-3]. Because random traps and random dopants are here considered as statistically independent entities, the system is able to simulate, for each statistical random doping configuration, Y random trap configurations where the variation is solely provided by the trap position for each of the X dopant levels. In various embodiments, in order to focus attention on the statistical tails of the leakage distribution (e.g., the portion of the leakage distribution above 5σ from the mean), the random traps are generated in a limited region of interest around the storage node contact, as shown schematically in FIG. 1, where the box indicates the area 180 where a random discrete trap 190 can be placed. The result of this process is presented in FIG. 4., which shows the complementary cumulative distribution of the leakage current for 5,000,000 statistical configurations of a single random trap (where Y=50,000 configurations) in the presence of random discrete dopants (where X=100 configurations).

330 and 340 have a two-fold benefit in neither worsening convergence and simulation yield compared to previous methodologies, and that the 330 and 340 can be performed in a similar amount of time to previous methodologies, because the post-processing evaluation time of the Y recombination terms is negligible with respect to the principal X simulations of the DRAM device. The relatively short evaluation time allows the running of hundreds of statistical TCAD simulations featuring discrete random dopants by means of a drift-diffusion simulator (per 330), and further allows for the addition of orders of magnitude more post-processing simulations featuring discrete traps (per 340). In this manner, method 300 can be used to easily obtain large statistical ensembles of data for the leakage currents, enabling the study of the statistical distribution tails, which is ultimately essential for optimal design for the DRAM device in the presence of statistical variability.

At 360, the system generates statistical compact models for use in circuit simulation. In contrast to a standard compact model for a circuit element in a simulation tool, which provides an average, nominal, or idealized response characteristic set for the modeled element, a statistical compact model allows variation in the response characteristic set. This variation in the statistical compact model representing the transistor has response characteristics (including leakage current) that vary from the average/nominal/idealized response characteristic set and match the simulated behavior profile developed in 330 and 340.

In accordance with various embodiments of the present disclosure, method 300 discusses TCAD simulation for only the case of a single random trap. TCAD simulation enables physical insight and accuracy of results, but TCAD simulation is orders of magnitude slower than integrated circuit simulation. Therefore, the aim is to obtain the fundamental statistical components via TCAD simulation and then execute the rest of the procedure via compact modelling and integrated circuit simulation. In doing so, the system first obtains the statistical distribution of the leakage current due to an arbitrary number of traps. The statistical distribution can be obtained via TCAD simulation, but in accordance with the present disclosure, the statistical distribution is done in a fast and accurate way via statistical methods by obtaining an accurate analytical description of the single-trap leakage distribution.

In order to obtain the best fitting results for the statistical distribution, with emphasis on the rare leakage event tails, the system fits the pass transistor leakage currents calculated in 330 to a first curve/distribution 415 using an automatic algorithm that selects the best distribution function and the best parameters to provide the best fit. In accordance with various embodiments, an automatic process is used to choose the best distribution function and the best parameters of that distribution function to fit the data. Examples of possible distribution functions can be, but are not limited to: Beta, Cauchy, Exponential, Gamma, Gaussian, Generalized Pareto, Johnsons, Pareto, Poisson, Rice, Weibull, and so on.

Figure 4:
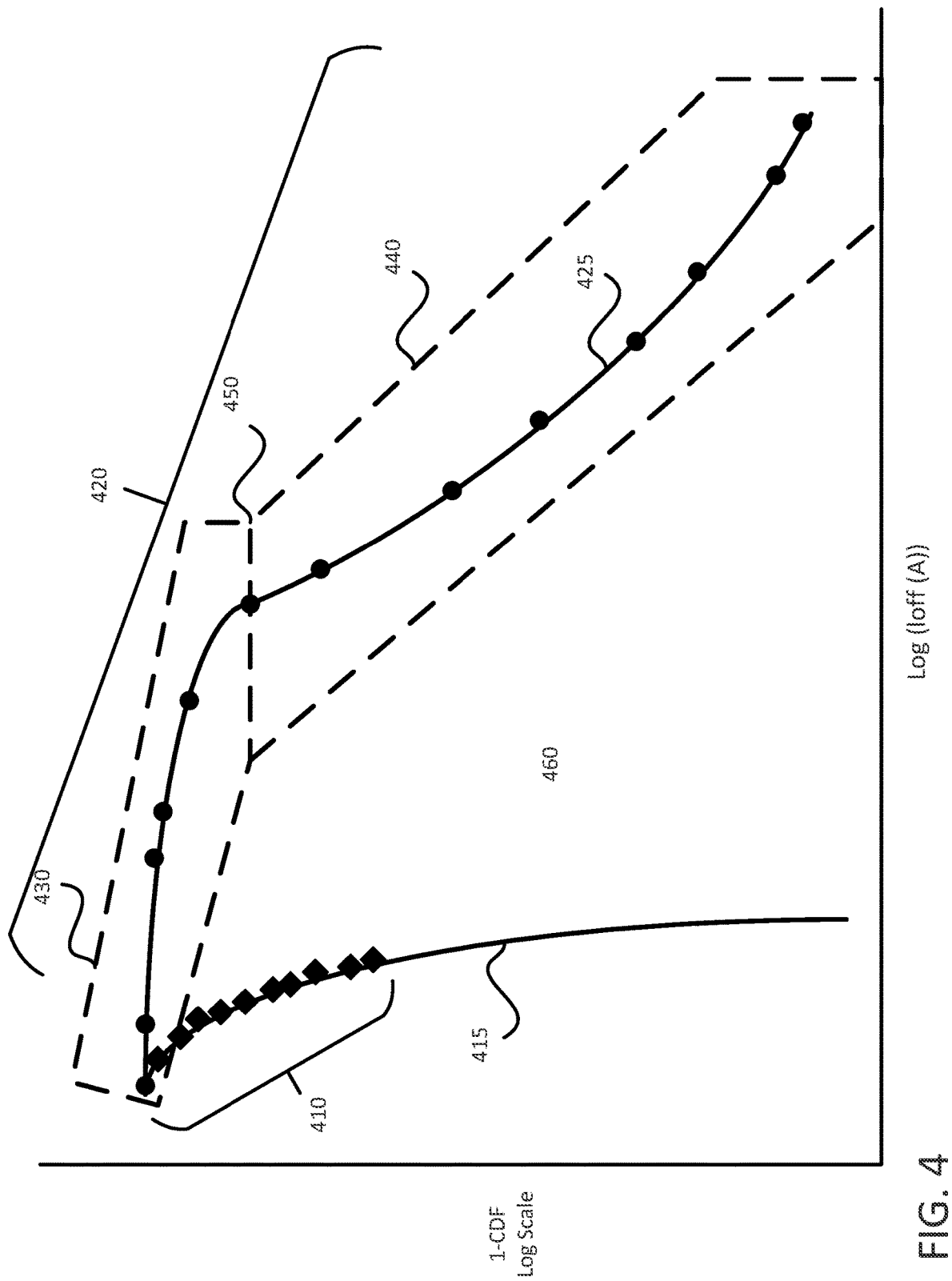
FIG. 4 illustrates a graph of TCAD results for leakage current in the DRAM cell due to random discrete dopants, and also due to a single random trap in the presence of random discrete dopants, in accordance with various embodiments of the president disclosure.

The curve fitting can be better understood with reference to FIG. 4, which illustrates a graph of TCAD results for leakage current in the advanced DRAM cell due to random discrete dopants, and also due to a single random trap in the presence of random discrete dopants, in accordance with various embodiments of the president disclosure. In FIG. 4, first data points 410 (illustrated as diamond data points) of the pass transistor leakage currents calculated in 330 are analyzed to fit a first curve 415. FIG. 4 shows a first curve 415 to fit the first data points 410 that is obtained via by a Rice distribution with parameters a=0.608, b=−17.642, and c=0.162. As will be appreciated, other embodiments can use different parameters and different distribution functions depending on the nature and values of the first data points 410. The set of first data points 420 monotonically decreases in value for 1-CDF (shown on the Y-axis), but may vary in the measured current (on the X-axis) due to statistical noise.

Additionally, the system fits the pass transistor leakage currents calculated in 340 to a second curve/distribution 425, using a combination of multiple distribution functions. In various embodiments, because of the wide variation of data and diverse statistical behavior, multiple distributions are used for better fitting. In accordance with various embodiments, the system first identifies a threshold 450 in the complementary cumulative distribution of data points, which defines boundary between the "bulk" of the distribution and the "tail" of the distribution.

With reference again to FIG. 4, second data points 420 (illustrated as circle data points) of the pass transistor leakage currents from 340 are analyzed to fit a second curve 425. A threshold 450 (which may be user-selectable or predefined) defines a cut-off between a bulk region 430 and a tail region 440 of the distribution of second data points 420 on the second curve 425. The bulk region 430 describes a collective number of the second data points 420 that are grouped above a threshold percentage above which the "bulk" of the data (e.g., 99% of the data points) reside, while the tail region 440 describes the remainder of the data points. Similarly to the set of first data points 410, the set of second data points 420 monotonically decreases in value for 1-CDF (shown on the Y-axis), but may vary in the measured current (on the X-axis) due to statistical noise.

In various embodiments, the analysis system can set various thresholds for differentiating the bulk region 430 from the tail region 440 of the complementary cumulative probability. According to the threshold 450, the second data points 420 located within a bulk region 430 are included in the "bulk" of the distribution, and the data points 420 located within a tail region 440 are included in the "tail" of the distribution. The system can use two different distribution schema or statistical models to fit the second data points 420 to the second curve 425 in each of the bulk region 430 and the tail region 440.

For example, the second data points 420 in the "bulk" of the distribution are fitted to the second curve 425 using the same procedure described above with respect to the first data points 410, whereas the second data points 420 in the 'tail' of the distribution are fitted to a distribution curve using the same procedure described above respect to the first data points 410, but with the modification of using the complementary cumulative distribution as the target of the fitting. Note that because the high leakage cases are important to more accurately represent the leakage currents, extra efforts are made in fitting the upper tail of the leakage distribution correctly (i.e., the portion of the second curve 425 in the tail region 440). To achieve this, the system uses the complementary cumulative distribution for the fitting, as this representation of the distribution emphasizes the upper tail.

In the illustrated example, the automatic process finds that the best fitting is achieved for the bulk region 430 of the second data points 420 with a Johnson distribution with parameters a=−7.1, b=1.59, c=−241.1, d=226.3. and the best fitting is achieved for the tail region 440 of the second data points 420 with a Weibull distribution with parameters a=0.91, b=−15.07, c=0.21. As will be appreciated, other embodiments can use different parameters and different distribution functions depending on the nature and values of the second data points 420.

In various embodiments, the first curve 415 represents a baseline leakage current distribution for the design under test, while the second curve 425 represents the additional-leakage current distribution for the additional leakage current due to one more trap 190 being present in the design. The system calculates a third distribution based on the baseline leakage current distribution and the additional-leakage current distribution (e.g., a third distribution) to represent the single trap induced drain leakage for use in a statistical compact model to extrapolate the leakage currents for various trap densities in the pass transistor.

At 360, the system generates a statistical compact model to represent a combination of the baseline and additional leakage current distributions. In various embodiments, the system adds the first curve 415 to the second curve 425 to produce a distribution for a single-trap induced leakage. The system identifies or creates a relation between the single-trap induced leakage distribution and one of the parameters of a static compact model that nominally represents an average leakage current, which is described in greater detail with respect to method 700 of FIG. 7, and the graph of FIG. 8. The present disclosure provides for generating leakage current values instead of model parameters.

At 370, the system simulates a statistical circuit, such as via integrated circuit simulations, using the statistical compact models generated in 360. An engineer can then quickly evaluate the performance of the DRAM cell circuit and apply modifications to the physical design to explore different physical designs for the DRAM cell circuit for use in a larger design layout without having to develop and test prototypes in silicon.

Figure 5A:
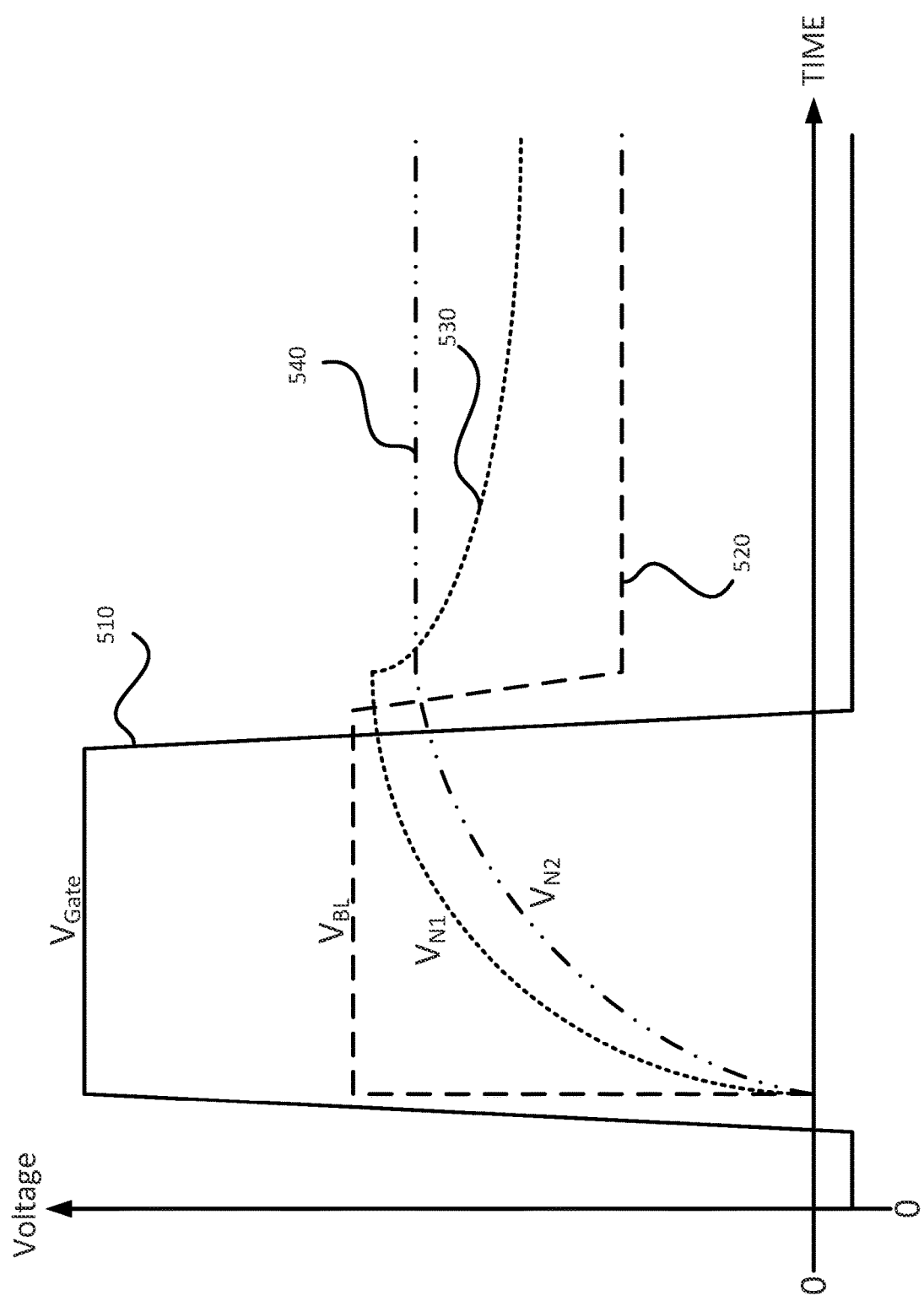
FIGS. 5A and 5B are waveform diagrams that illustrate the waveform stimuli (voltages) applied to the DRAM cell circuit during various operational phases, according to various embodiments of the present disclosure.

FIG. 5A is a waveform diagram that illustrates the waveform stimuli (voltages) applied to the DRAM cell circuit during a write operation, according to various embodiments of the present disclosure. Over a period of time, a gate voltage 510 ($V_{Gate}$) is applied to the gate of the pass transistor 235 and a bit-line voltage 520 ($V_{BL}$) is applied to the bit-line input to produce an input voltage 530 ($V_{N1}$) and a stored voltage 540 ($V_{N2}$) in the DRAM cell.

Figure 5B:
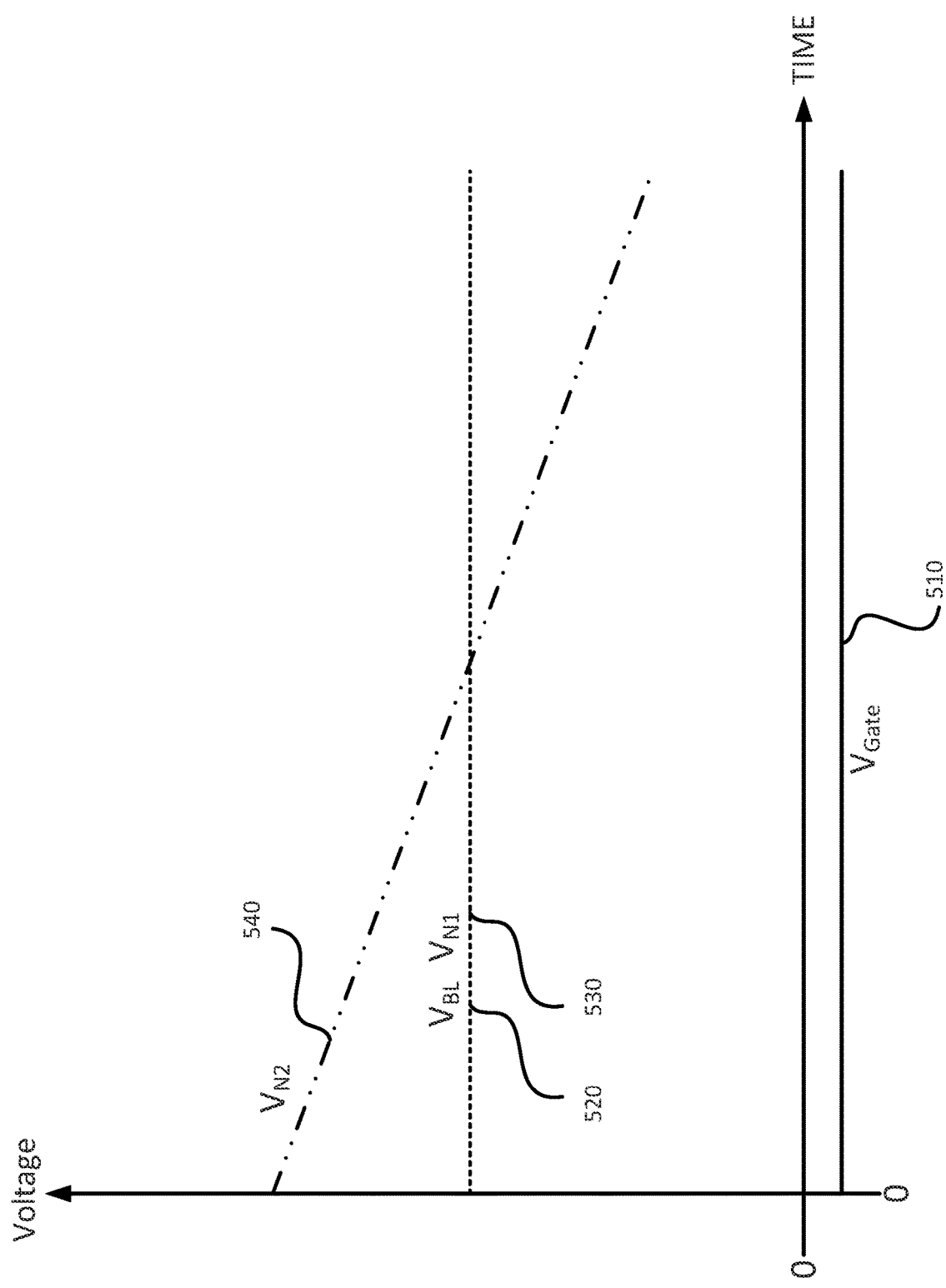

FIG. 5B is a waveform diagram that illustrates the voltages of the DRAM cell circuit when left in a hold condition during retention, according to various embodiments of the present disclosure. As will be appreciated, during retention, the gate voltage 510 ($V_{Gate}$) is removed or otherwise set below the gating threshold to turn the pass transistor 235 to the OFF state. Because the pass transistor 235 is OFF during retention, the precise value of the bit-line voltage 520 ($V_{BL}$) and input voltage 530 ($V_{N1}$) are fixed to the pre-charge voltage without affecting the stored voltage 540 ($V_{N2}$), also referred to as the capacitor voltage for the storage capacitor. However, due to transistor leakage current, the stored voltage 540 ($V_{N2}$) decreases over time during retention. Integrated circuit simulations are performed for all of the leakage currents determined by 320, thereby determining how the stored voltage 540 ($V_{N2}$) decreases over time due to the leakage currents at the specified trap densities.

Figure 6:
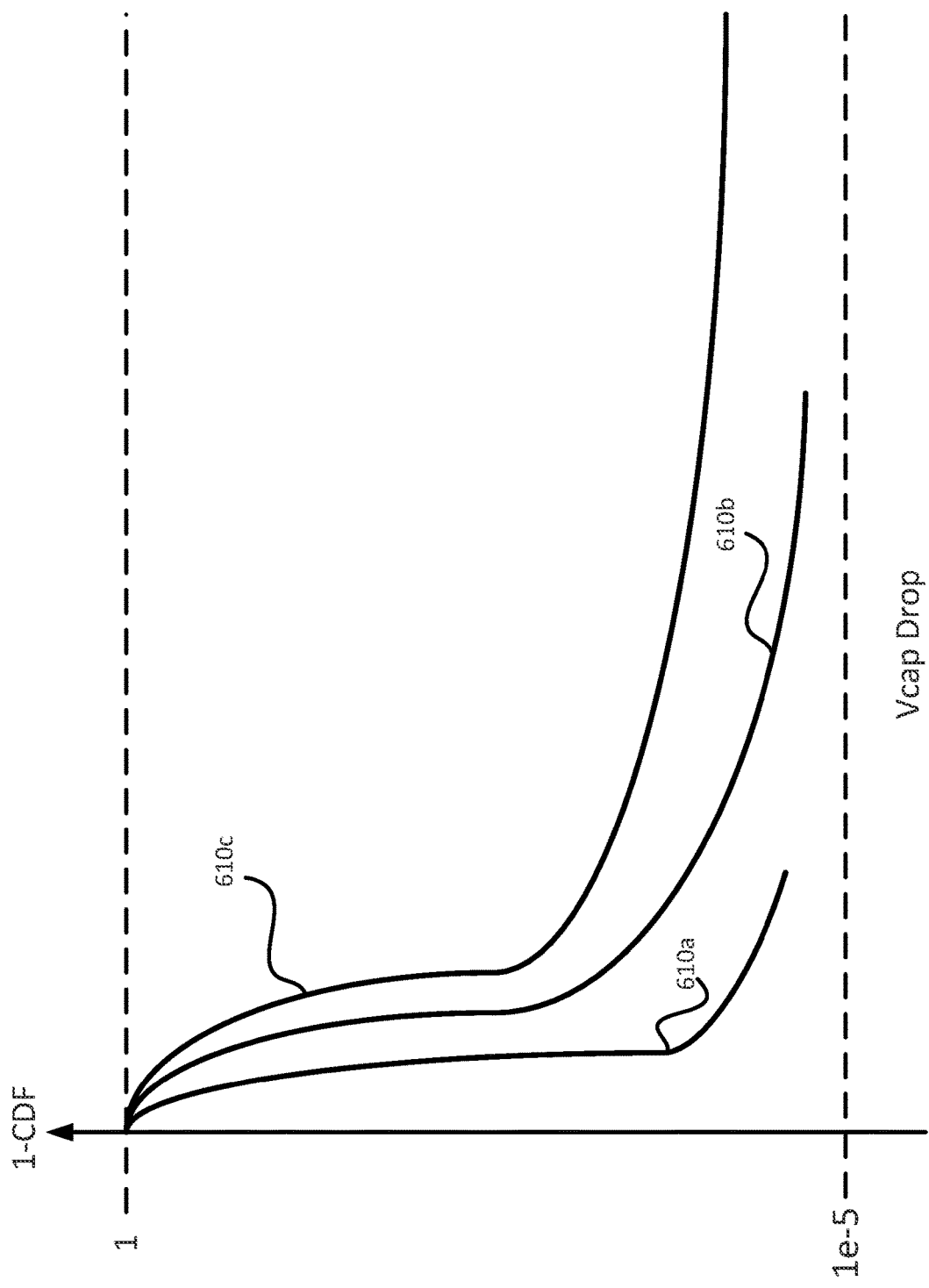
FIG. 6 is a graph of statistical circuit simulation results showing the storage node voltage distribution for a given refresh time in three different trap density scenarios in accordance with various embodiments of the present disclosure.

FIG. 6 is a graph of statistical circuit simulation results showing storage node voltage distribution for a given refresh time in three different trap density scenarios in accordance with various embodiments of the present disclosure. More specifically, FIG. 6 illustrates curves 610a-c, which represent the simulated voltage drop of the capacitor node voltage $V_{CAP}$ after 20 ms (milliseconds) of hold time for different trap densities (e.g., $1 \times 10^{16}$ traps/cm$^3$, $1 \times 10^{17}$ traps/cm$^3$ and $1 \times 10^{18}$ traps/cm$^3$, respectively).

The curves 610a-c show the log-normal dependency of refresh time on leakage current, and the results of FIG. 6 are used to determine whether the TCAD transistor design is adequate (e.g., satisfies a refresh time threshold or other threshold), or should be modified. The operator (e.g., a user or the system) can set various values of a refresh time threshold for when to modify a transistor design (or mark the design as adequate), when the refresh time (i.e., the time that a bit stored in memory can remain readable without being read back into memory) does not satisfy a specified threshold. For example, an operator may take various actions to modify the underlying design to improve the refresh time, including changing: the concentrations or types of dopants used, the size of the transistor, gate materials for constructing the transistor, geometry of the transistor, bias of the transistor, a layout of the circuit element that includes the transistor, and the like.

Figure 7:
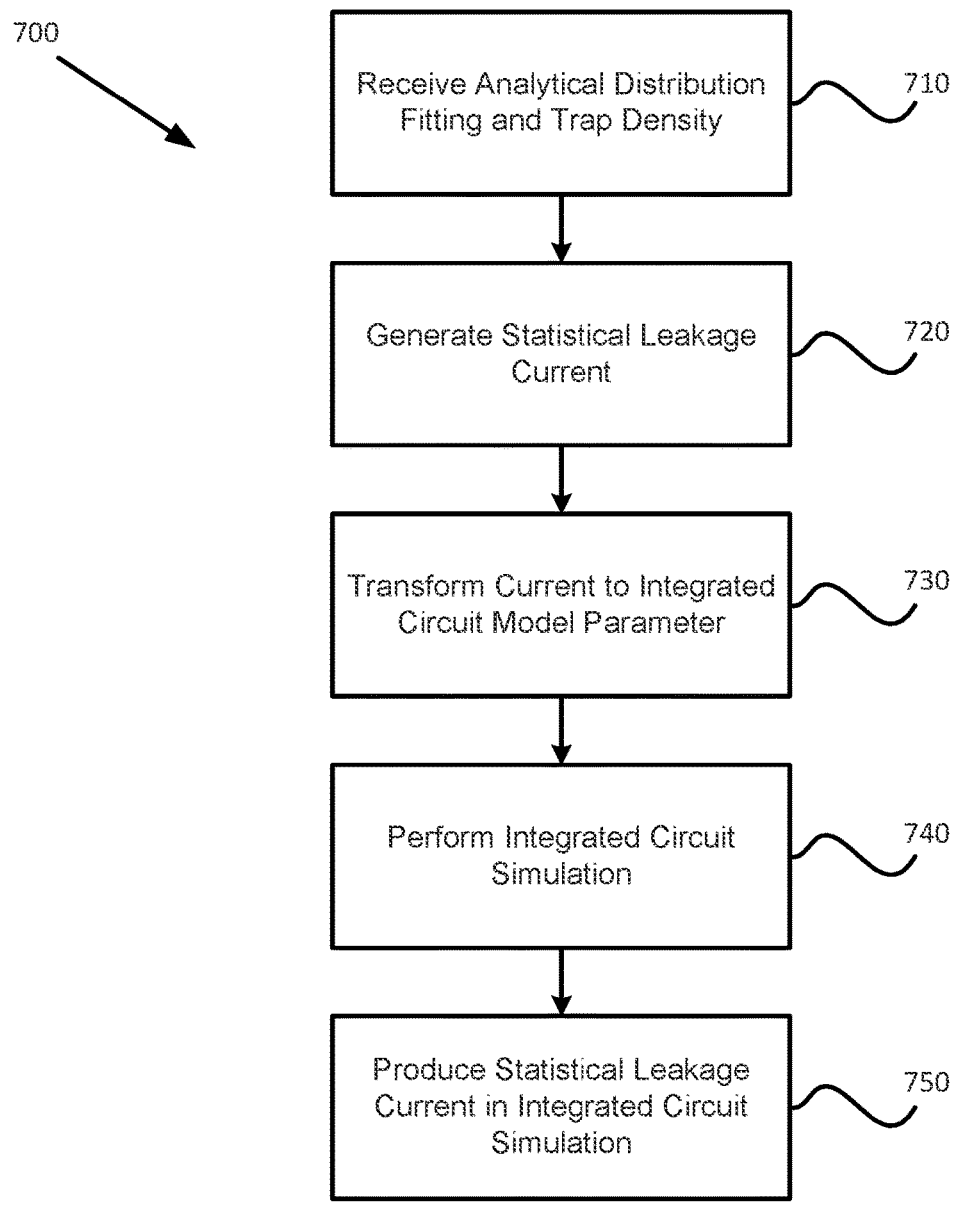
FIG. 7 is a flowchart of a method for performing a simulation format transform, according to various embodiments of the present disclosure.

FIG. 7 is a flowchart of a method 700 for performing a TCAD-to-Circuit transform, according to various embodiments of the present disclosure, such as in 360 of method 300, discussed in relation to FIG. 3. In various embodiments, the analyses system performs method 700 in response to receiving the single-trap induced leakage distribution (e.g., as output from 340 of method 300 and shown as curve 425 in FIG. 4), to generate statistical leakage compact SPICE models for use in SPICE simulations to calculate statistical leakage currents (e.g., as input for 370 of method 300).

At 710, the analysis system receives the analytical distribution fitting and trap density. The analytical distribution fitting is the single-trap leakage current distribution generated per method 300 that incorporates both the baseline (415) and induced leakage current distributions (425). In various embodiments, the trap densities can be arbitrary values or user-defined values selected for analysis. The trap density operates as a multiplier, which is used to increase the average number of traps in the previously performed single-trap simulations and match the single-trap induced leakage current distribution to the specified trap density.

Figure 8:
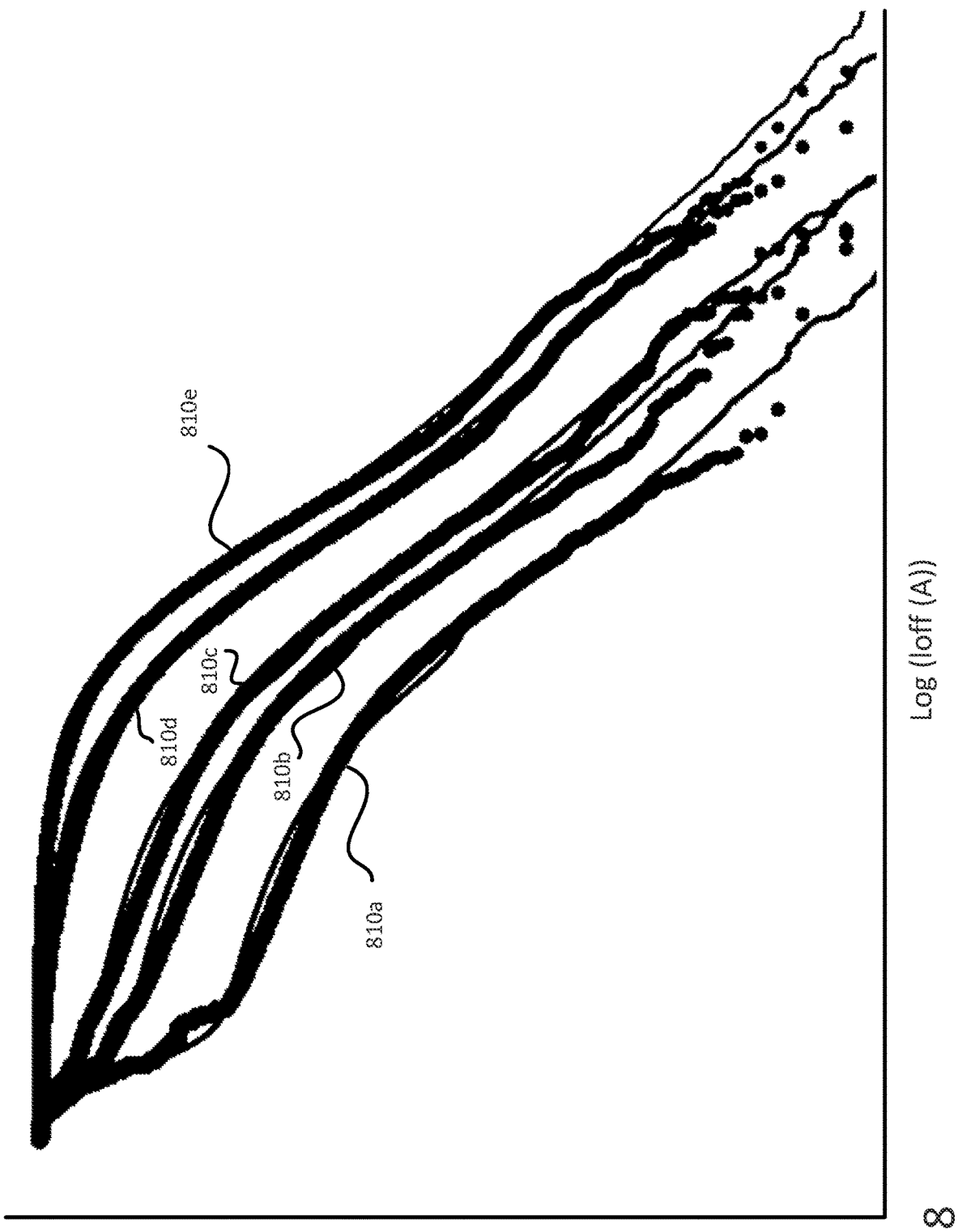
FIG. 8 is a graph illustrating a comparison of leakage currents obtained from compact model statistical generation and leakages obtained from TCAD simulation for several trap density distributions in accordance with embodiments of the present disclosure.

At 720, the analysis system generates a statistical leakage current based on the single-trap induced leakage current distribution to the specified trap density. To analyze the pass transistor for a given trap density, a statistical simulation is performed. However, there may be two levels of randomization: an actual number of traps 190 (calculated by trap density*volume of silicon=mean number of traps, which is still handled as a distribution and not a discrete value by the processing system), and a leakage current from a single trap (as described by the single-trap induced leakage current distribution). Accordingly, the single-trap induced leakage current distribution can be used to generate a plurality of different currents for a specified trap density (e.g., as shown in FIG. 8). For each trap density, and for each circuit instance the analysis system generates an actual number of traps and a random leakage current for each trap described therein based on the single trap current distribution (the second curve 425). Summing the total trap currents with the baseline leakage current distribution (the first curve 415) then gives the random leakage current for that instance of the cell.

FIG. 8 is a graph illustrating a comparison of leakage current distribution curves 810a-e obtained from compact model statistical generation (i.e., the output of 720 of FIG. 7) and leakages obtained from TCAD simulation for several trap density distributions in accordance with various embodiments of the present disclosure. More specifically, FIG. 8 shows leakage current distribution curves 810a-e obtained from compact model statistical generation using arbitrary or user defined trap densities (e.g., $1\times10^{16}$ traps/cm$^3$, $5\times10^{16}$ traps/cm$^3$, $1\times10^{17}$ traps/cm$^3$, $5\times10^{17}$ traps/cm$^3$, and $1\times10^{18}$ traps/cm$^3$, respectively. Thus, FIG. 8 shows that the compact model simulations accurately reproduce the leakage current distributions generated from TCAD simulation.

In various embodiments, the system obtains a third plurality of leakage currents on the leakage current distribution curves (e.g., 810a-e) via manipulating two statistically-selected variables to affect the statistically distributed currents fitted to the distributions. A value for the first variable used to affect the leakage current observed in the statistical compact model is selected at random according to the baseline leakage current distribution (e.g., curve 415). A value for the second variable used to affect the leakage current observed in the statistical compact model is selected at random according to the additional leakage current distribution (e.g., curve 425). In various embodiments, the last operation is repeated N times, where N is the number of traps (190) in the transistor (e.g., based on a specified trap density and a volume of the transistor). The N random values of leakage current are summed up to get a total leakage current.

Returning to FIG. 7, at 730, the analysis system transforms the statistical leakage current distribution (generated per 720) into an integrated circuit model parameter. For example, the statistical leakage current curve is transformed from a first descriptive language generated in a TCAD application to a second descriptive language used in an integrated circuit simulator (e.g., SPICE). The statistical range of the leakage current distribution allows the integrated circuit model to act as a statistical compact model, rather than a static compact model with only one value per parameter.

At 740, the analysis system performs an integrated circuit simulation using a statistical compact model using the integrated circuit model parameter based on the statistical leakage current distribution. Note that once a baseline static compact model (i.e., the underlying characteristics of the DRAM cell without including trap-based leakage effects) is extracted, a very large number of statistical compact models can be obtained for an arbitrary number of traps. Accordingly, the leakage current is randomized based on the trap leakage distribution fitting. Each random leakage current sample is considered as an updated compact model (which is effectively a baseline static compact model and a randomized leakage value). The parameter in the statistical compact model allows the statistical compact model to produce different leakage currents with associated probabilities of occurrence corresponding to the range of leakage currents described by the statistical leakage current distribution.

At 750, the analysis system produces a statistical leakage current in the SPICE circuit simulation. This statistical leakage current is provided to a user for evaluating a current design of the DRAM cell. In some embodiments, the statistical leakage current is used to evaluate the refresh time so that, when the refresh time is below a threshold value (e.g., when the statistical leakage current is above a threshold value), the user is prompted to select a new parameter or set of parameters for the design of the DRAM cell. Using the statistical compact model, the user can select new parameters for reevaluation, and quickly reevaluate the DRAM cell using the new parameters.

Figure 9:
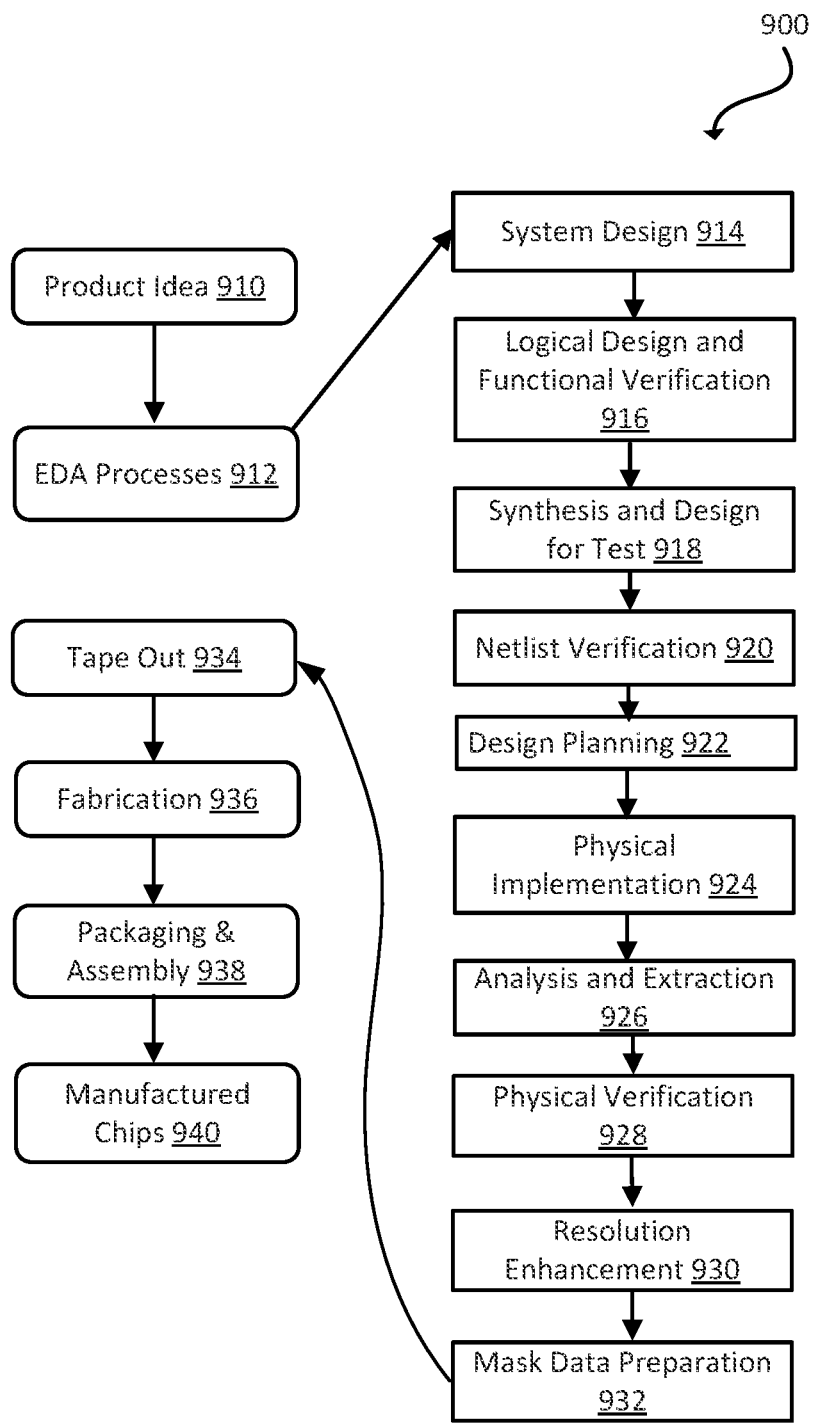
FIG. 9 depicts a flowchart of various processes used during the design and manufacture of an integrated circuit in accordance with some embodiments of the present disclosure.

FIG. 9 illustrates an example set of processes 900 used during the design, verification, and fabrication of an article of manufacture such as an integrated circuit to transform and verify design data and instructions that represent the integrated circuit. Each of these processes can be structured and enabled as multiple modules or operations. The term 'EDA' signifies the term 'Electronic Design Automation.' These processes start with the creation of a product idea 910 with information supplied by a designer, information which is transformed to create an article of manufacture that uses a set of EDA processes 912. When the design is finalized, the design is taped-out 934, which is when artwork (e.g., geometric patterns) for the integrated circuit is sent to a fabrication facility to manufacture the mask set, which is then used to manufacture the integrated circuit. After tape-out, a semiconductor die is fabricated 936 and packaging and assembly processes 938 are performed to produce the finished integrated circuit 940.

Specifications for a circuit or electronic structure may range from low-level transistor material layouts to high-level description languages. A high-level of representation may be used to design circuits and systems, using a hardware description language ('HDL') such as VHDL, Verilog, SystemVerilog, SystemC, MyHDL or OpenVera. The HDL description can be transformed to a logic-level register transfer level ('RTL') description, a gate-level description, a layout-level description, or a mask-level description. Each lower representation level that is a more detailed description adds more useful detail into the design description, for example, more details for the modules that include the description. The higher levels of detail that are more representative descriptions can be generated by a computer, derived from a design library, or created by another design automation process. An example of a specification language at a lower level of representation language for specifying more detailed descriptions is SPICE, which is used for detailed descriptions of circuits with many analog components. Descriptions at each level of representation are enabled for use by the corresponding tools of that layer (e.g., a formal verification tool). A design process may use a sequence depicted in FIG. 9. The processes described by be enabled by EDA products (or tools).

During system design 914, functionality of an integrated circuit to be manufactured is specified. The design may be optimized for desired characteristics such as power consumption, performance, area (physical and/or lines of code), and reduction of costs, etc. Partitioning of the design into different types of modules or components can occur at this stage.

During logic design and functional verification 916, modules or components in the circuit are specified in one or more description languages and the specification is checked for functional accuracy. For example, the components of the circuit may be verified to generate outputs that match the requirements of the specification of the circuit or system being designed. Functional verification may use simulators and other programs such as testbench generators, static HDL checkers, and formal verifiers. In some embodiments, special systems of components referred to as 'emulators' or 'prototyping systems' are used to speed up the functional verification.

During synthesis and design for test 918, HDL code is transformed to a netlist. In some embodiments, a netlist may be a graph structure where edges of the graph structure represent components of a circuit and where the nodes of the graph structure represent how the components are interconnected. Both the HDL code and the netlist are hierarchical articles of manufacture that can be used by an EDA product to verify that the integrated circuit, when manufactured, performs according to the specified design. The netlist can be optimized for a target semiconductor manufacturing technology. Additionally, the finished integrated circuit may be tested to verify that the integrated circuit satisfies the requirements of the specification.

During netlist verification 920, the netlist is checked for compliance with timing constraints and for correspondence with the HDL code. During design planning 922, an overall floor plan for the integrated circuit is constructed and analyzed for timing and top-level routing.

During layout or physical implementation 924, physical placement (positioning of circuit components such as transistors or capacitors) and routing (connection of the circuit components by multiple conductors) occurs, and the selection of cells from a library to enable specific logic functions can be performed. As used herein, the term 'cell' may specify a set of transistors, other components, and interconnections that provides a Boolean logic function (e.g., AND, OR, NOT, XOR) or a storage function (such as a flipflop or latch). As used herein, a circuit 'block' may refer to two or more cells. Both a cell and a circuit block can be referred to as a module or component and are enabled as both physical structures and in simulations. Parameters are specified for selected cells (based on 'standard cells') such as size and made accessible in a database for use by EDA products.

During analysis and extraction 926, the circuit function is verified at the layout level, which permits refinement of the layout design. During physical verification 928, the layout design is checked to ensure that manufacturing constraints are correct, such as DRC constraints, electrical constraints, lithographic constraints, and that circuitry function matches the HDL design specification. During resolution enhancement 930, the geometry of the layout is transformed to improve how the circuit design is manufactured.

During tape-out, data is created to be used (after lithographic enhancements are applied if appropriate) for production of lithography masks. During mask data preparation 932, the 'tape-out' data is used to produce lithography masks that are used to produce finished integrated circuits.

A storage subsystem of a computer system (such as computer system 500 of FIG. 5) may be used to store the programs and data structures that are used by some or all of the EDA products described herein, and products used for development of cells for the library and for physical and logical design that use the library.

Figure 10:
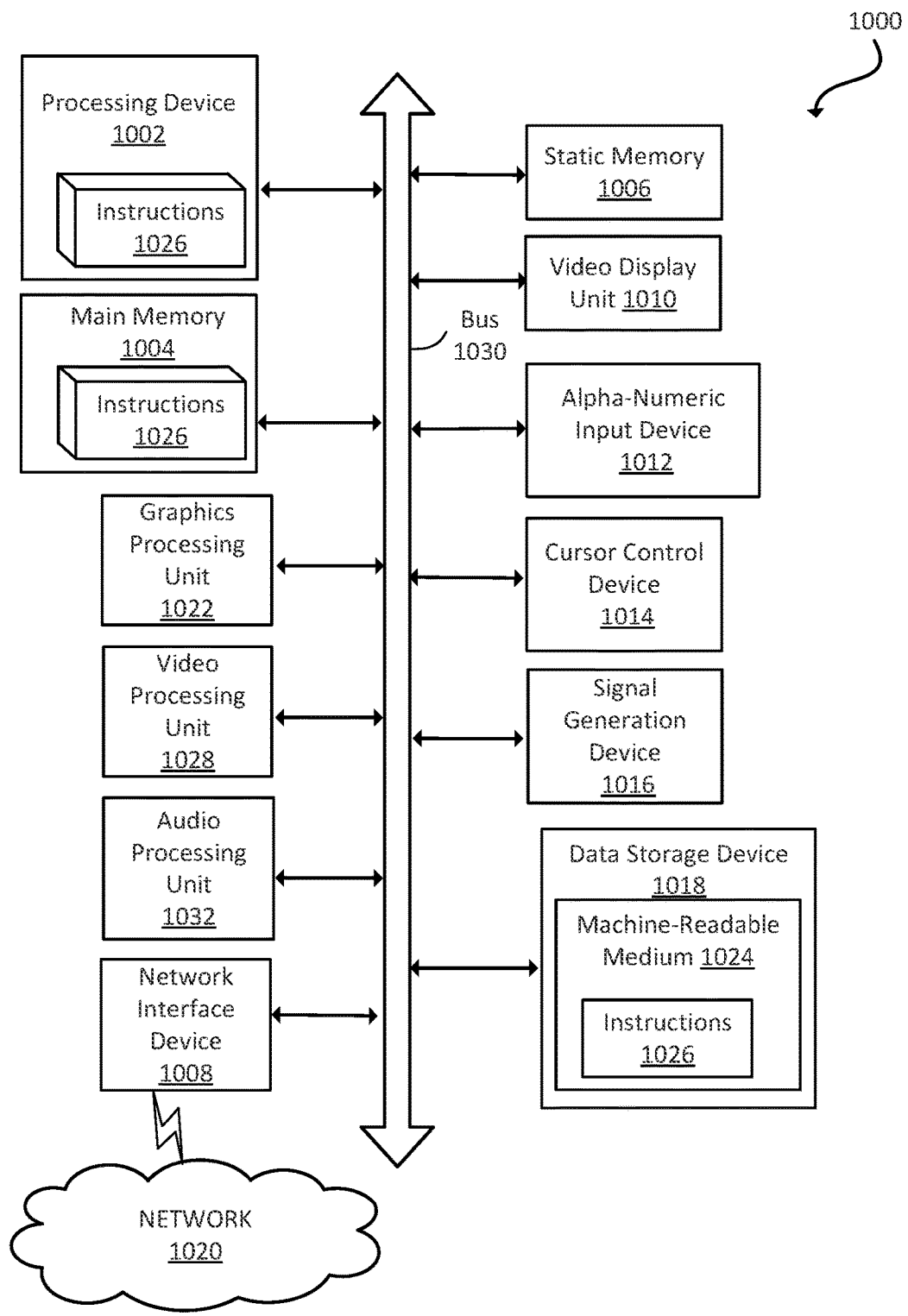
FIG. 10 depicts a diagram of an example computer system in which embodiments of the present disclosure may operate.

FIG. 10 illustrates an example machine of a computer system 1000 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 1000 includes a processing device 1002, a main memory 1004 (e.g., read-only memory (ROM), flash memory, dynamic random access memory (DRAM) such as synchronous DRAM (SDRAM), a static memory 1006 (e.g., flash memory, static random access memory (SRAM), etc.), and a data storage device 1018, which communicate with each other via a bus 1030.

Processing device 1002 represents one or more processors such as a microprocessor, a central processing unit, or the like. More particularly, the processing device may be complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 1002 may also be one or more special-purpose processing devices such as an application specific integrated circuit (ASIC), a field programmable gate array (FPGA), a digital signal processor (DSP), network processor, or the like. The processing device 1002 may be configured to execute instructions 1026 for performing the operations and steps described herein.

The computer system 1000 may further include a network interface device 1008 to communicate over the network 1020. The computer system 1000 also may include a video display unit 1010 (e.g., a liquid crystal display (LCD) or a cathode ray tube (CRT)), an alphanumeric input device 1012 (e.g., a keyboard), a cursor control device 1014 (e.g., a mouse), a graphics processing unit 1022, a signal generation device 1016 (e.g., a speaker), graphics processing unit 1022, video processing unit 1028, and audio processing unit 1032.

The data storage device 1018 may include a machine-readable storage medium 1024 (also known as a non-transitory computer-readable medium) on which is stored one or more sets of instructions 1026 or software embodying any one or more of the methodologies or functions described herein. The instructions 1026 may also reside, completely or at least partially, within the main memory 1004 and/or within the processing device 1002 during execution thereof by the computer system 1000, the main memory 1004 and the processing device 1002 also constituting machine-readable storage media.

In some implementations, the instructions 1026 include instructions to implement functionality corresponding to the present disclosure. While the machine-readable storage medium 1024 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine and the processing device 1002 to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm may be a sequence of operations leading to a desired result. The operations are those requiring physical manipulations of physical quantities. Such quantities may take the form of electrical or magnetic signals capable of being stored, combined, compared, and otherwise manipulated. Such signals may be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform the method. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. Where the disclosure refers to some elements in the singular tense, more than one element can be depicted in the figures and like elements are labeled with like numerals. The disclosure and drawings are, accordingly, to be regarded in an illustrative sense rather than a restrictive sense.

What is claimed is:

1. A system comprising:
a processor; and
a memory including instructions that when executed by the processor perform an operation including:
generating a first plurality of transistor leakage currents by simulating different dopant configurations in a transistor;
generating a second plurality of transistor leakage currents by simulating, for each dopant configuration of the different dopant configurations, a single trap insertion in the transistor;
fitting the first plurality of transistor leakage currents to a first leakage current distribution;
fitting the second plurality of transistor leakage currents to a second leakage current distribution;
generating a third plurality of leakage currents for a specified trap density for the transistor based on the first and second leakage current distributions;
transforming the third plurality of leakage currents to a model parameter for a DRAM cell including the transistor; and
evaluating the DRAM cell including the transistor based on the model parameter.

2. The system of claim 1, wherein the DRAM cell is modeled as a statistical compact model, and the third plurality of leakage currents is statistically obtained from a combination of the first leakage current distribution and the second leakage current distribution and the specified trap density.

3. The system of claim 1, wherein traps are randomly distributed in the transistor according to the specified trap density.

4. The system of claim 1, wherein the first plurality of transistor leakage currents are generated using principal drift-diffusion equations, but not recombination equations, and wherein each of the second plurality of transistor leakage currents are generated using the recombination equations.

5. The system of claim 1, wherein the first leakage current distribution is fitted to the first plurality of transistor leakage currents using a single statistical model and wherein the second leakage current distribution is fitted to the second plurality of transistor leakage currents using two statistical models, wherein a bulk region of the second leakage current distribution is fitted to the second plurality of transistor leakage currents using a first statistical model, and a tail region of the second leakage current distribution is fitted to the second plurality of transistor leakage currents using a second statistical model, wherein the bulk region represents a collective number of the second plurality of transistor leakage currents above a threshold percentage.

6. The system of claim 1, wherein the specified trap density represents a Poisson distribution of imperfections in a source or drain region of the transistor.

7. A method comprising:
generating a first plurality of transistor leakage currents by simulating different dopant configurations in a transistor;
generating a second plurality of transistor leakage currents by simulating, for each dopant configuration of the different dopant configurations, a single trap insertion in the transistor;
fitting the first plurality of transistor leakage currents to a first leakage current distribution;
fitting the second plurality of transistor leakage currents to a second leakage current distribution;
combining the first leakage current distribution and the second leakage current distribution to produce a third leakage current distribution;
generating a third plurality of statistically generated leakage currents for a specified trap density for the transistor based on the first and second leakage current distributions and the specified trap density;
mapping the third plurality of statistically generated leakage currents to model parameter values for circuit simulation of a DRAM cell including the transistor; and
evaluating the DRAM cell including the transistor based on the model parameter values.

8. The method of claim 7, wherein the DRAM cell is modeled as a statistical compact model, and the third plurality of statistically generated leakage currents is obtained from the combination of the first leakage current distribution and the second leakage current distribution and the specified trap density.

9. The method of claim 7, wherein traps are randomly distributed in the transistor according to the specified trap density.

10. The method of claim 7, wherein the first plurality of transistor leakage currents are generated using principal drift-diffusion equations, but not recombination equations, and wherein each of the second plurality of transistor leakage currents are generated using the recombination equations.

11. The method of claim 7, wherein combining the first leakage current distribution and the second leakage current distribution to produce a third leakage current distribution for the specified trap density further comprises:
obtaining a third plurality of statistically generated leakage currents that are statistically distributed by summing:
a first variable having a first value statistically selected according to the first leakage current distribution; and
N additional variables having independent values randomly sampled from the second leakage current distribution, where N is a number of traps simulated in the transistor.

12. The method of claim 7, wherein the first leakage current distribution is fitted to the first plurality of transistor leakage currents using a single statistical model and wherein the second leakage current distribution is fitted to the second plurality of transistor leakage currents using two statistical models, wherein a bulk region of the second leakage current distribution is fitted to the second plurality of transistor leakage currents using a first statistical model, and a tail region of the second leakage current distribution is fitted to the second plurality of transistor leakage currents using a second statistical model, wherein the bulk region represents a collective number of the second plurality of transistor leakage currents above a threshold percentage.

13. The method of claim 12, wherein the second statistical model implements a complementary cumulative distribution.

14. The method of claim 7, wherein the specified trap density represents a Poisson distribution of imperfections in a source or drain region of the transistor.

15. A non-transitory computer-readable storage medium including instructions that when executed by a processor perform an operation comprising:
evaluating a statistical compact model of a DRAM cell with a first trap density to determine whether a refresh time emulated for a pass transistor included in the DRAM cell satisfies a threshold;

in response to determining that the refresh time does not satisfy the threshold:
  selecting a second, different trap density for the DRAM cell;
  reevaluating the statistical compact model of a DRAM cell with the second trap density to determine whether the refresh time emulated for the pass transistor included in the DRAM cell satisfies the threshold;
in response to the refresh time satisfying the threshold, indicating the DRAM cell to be acceptable;
wherein:
  the statistical compact model is generated via a first plurality of statistical simulations of the DRAM cell that produces a first leakage current distribution representing a baseline leakage current and a second plurality of statistical simulations of the DRAM cell that produces a second leakage current distribution representing an additional-leakage current distribution, wherein the first and second leakage current distributions are combined to create a third leakage current distribution representing an induced drain leakage in the DRAM cell; and
  the third leakage current distribution is extrapolated based on a specified trap density to describe a statistical leakage current for the DRAM cell at the specified trap density.

16. The non-transitory computer-readable storage medium of claim 15, wherein the first plurality of statistical simulations are performed using principal drift-diffusion equations, but not recombination equations.

17. The non-transitory computer-readable storage medium of claim 15, wherein each of the second plurality of statistical simulations is performed using recombination equations.

18. The non-transitory computer-readable storage medium of claim 15, wherein the second plurality of statistical simulations is performed based on each statistical simulation of the first plurality of statistical simulations.

19. The non-transitory computer-readable storage medium of claim 15, wherein the first plurality of statistical simulations produce first pass transistor leakage currents that are fitted to the first leakage current distribution using a single statistical model and wherein the second plurality of statistical simulations produce second pass transistor leakage currents are fitted to the second leakage current distribution using two statistical models, wherein a bulk region of the second pass transistor leakage currents are fitted to the second leakage current distribution using a first statistical model, and a tail region of the second pass transistor leakage currents are fitted to the second leakage current distribution using a second statistical model, wherein the bulk region represents a collective number of the second pass transistor leakage currents above a threshold percentage.

20. The non-transitory computer-readable storage medium of claim 15, wherein the first plurality of statistical simulations are performed using principal drift-diffusion equations, but not recombination equations, and, wherein each of the second plurality of statistical simulations is performed using recombination equations.

\* \* \* \* \*